(12) United States Patent
Gollungberg

(10) Patent No.: US 6,402,198 B2
(45) Date of Patent: *Jun. 11, 2002

(54) FUEL TANK FOR A HEAVY VEHICLE

(75) Inventor: Magnus Gollungberg, Myggenäs (SE)

(73) Assignee: Volvo Lastvagnar AB, Gothenburg (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 9 days.

(21) Appl. No.: 09/355,182
(22) PCT Filed: Feb. 9, 1998
(86) PCT No.: PCT/SE98/00218
§ 371 (c)(1),
(2), (4) Date: Jul. 27, 1999
(87) PCT Pub. No.: WO98/34808
PCT Pub. Date: Aug. 13, 1998

(30) Foreign Application Priority Data

Feb. 10, 1997 (SE) .............................. 9700464

(51) Int. Cl.$^7$ .................................... B60P 3/22
(52) U.S. Cl. ................. 280/830; 280/833; 280/834
(58) Field of Search ........................ 280/830, 833, 280/834

(56) References Cited

U.S. PATENT DOCUMENTS

| 2,276,963 A | * | 3/1942 | Griffin | 280/833 |
| 2,410,182 A | * | 10/1946 | Prior | 280/833 |
| 2,569,493 A | * | 10/1951 | Prior | 280/833 |
| 2,622,887 A | * | 12/1952 | Prior | 280/833 |
| 5,054,799 A | * | 10/1991 | Fingerle | 280/833 X |

FOREIGN PATENT DOCUMENTS

| DE | 3441220 | | 5/1986 | |
| WO | 093012946 A | * | 7/1993 | 280/833 |

OTHER PUBLICATIONS

Patent Abstracts of Japan, vol. 9, No. 3, Japanese Patent No. 59–153620, Mazda K.K., Sep. 1, 1984, abstract.

* cited by examiner

Primary Examiner—Kevin Hurley
Assistant Examiner—Christopher Buchanan
(74) Attorney, Agent, or Firm—Samuels, Gauthier & Stevens, LLP

(57) ABSTRACT

The invention relates to a fuel tank (1) for heavy vehicles, said fuel tank being adapted for mounting to a vehicle frame (2) by means of at least one supporting bracket (3) which discloses a partly circular contact surface (4) against said fuel tank, wherein the tank (1) comprises two end gable sections (5, 6) and an essentially cylindrical casing section (7) which extends between said end gable sections. The invention is in particular characterized in that the fuel tank (1) comprises a first section (8) which is partly circular and faces towards the vehicle frame (2) and is adapted for bearing against said partly circular contact surface (4) on the supporting bracket (3), and a second section (9) which is essentially rectangular and faces away from the vehicle frame (2).

6 Claims, 1 Drawing Sheet

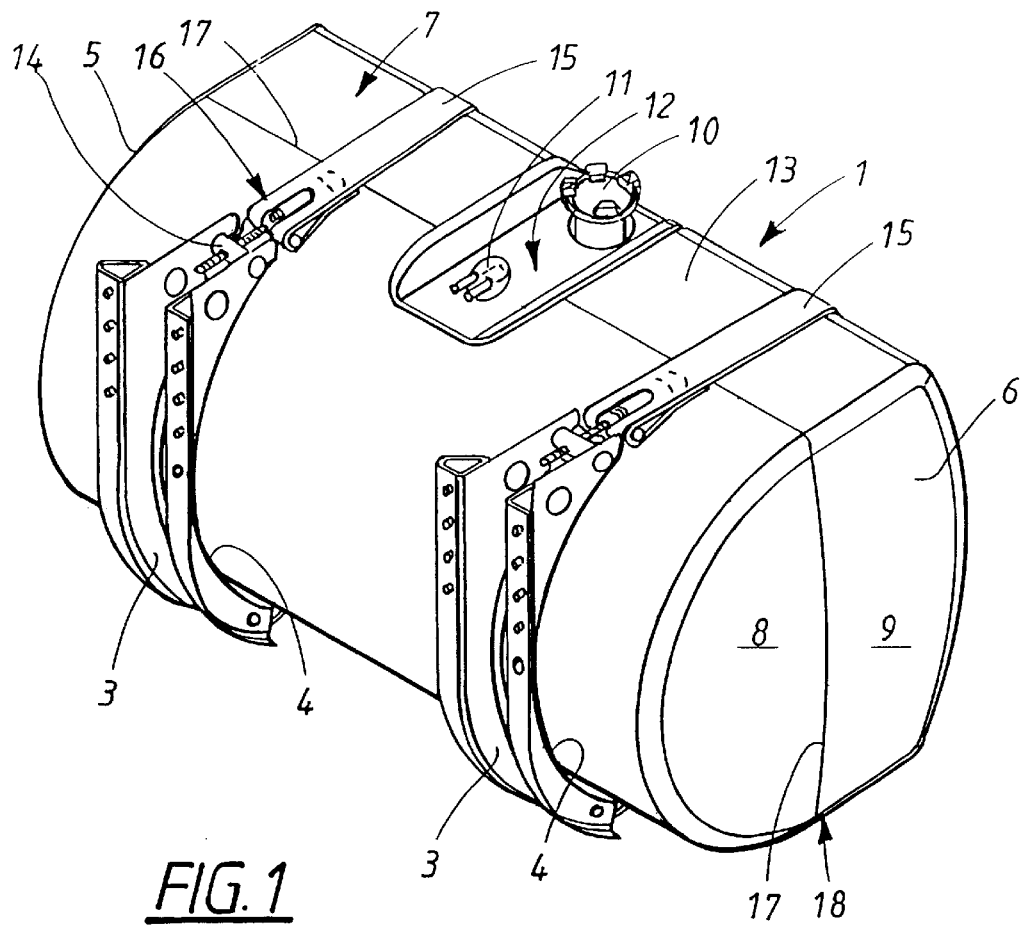
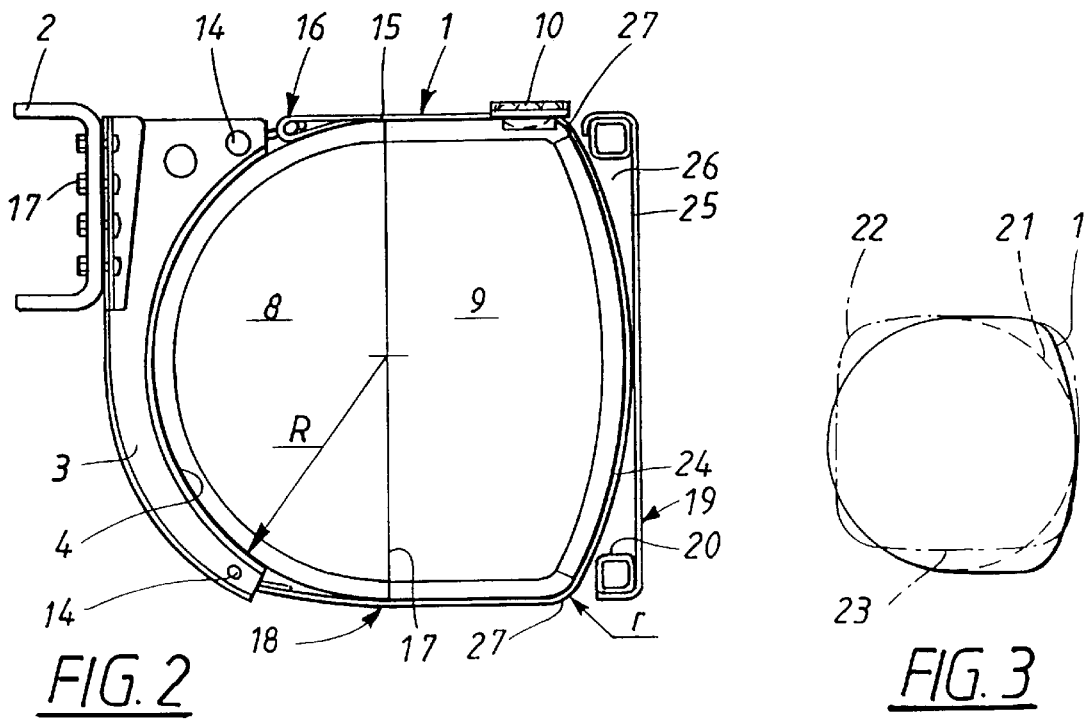

FUEL TANK FOR A HEAVY VEHICLE

TECHNICAL FIELD

The present invention relates to a fuel tank for heavy vehicles, for example a lorry. The invention relates in particular to a fuel tank of the type which is mounted to a vehicle frame by means of at least one supporting bracket or the like, said vehicle frame extending in the longitudinal direction of the vehicle.

BACKGROUND OF THE INVENTION

Fuel tanks for heavy vehicles, particularly heavy-goods vehicles, are generally cylindrically designed having two end gables and an intermediate casing surface. Two main types of fuel tanks are available on the market, wherein one of the tanks is circularly cylindrical hereinafter called the circular tank—and the other tank is rectangularly cylindrical—hereinafter called the rectangular tank.

Traditionally, the circular tank is the dominant tank type in, among other countries, the USA, where the "round" tanks are considered to constitute an essential part of the overall appearance of the lorry and therefore, for reasons of appearance, often are chromium-plated on the outside. Thus, rectangular tanks are as yet hard to sell on the american market, even though an increased use of so-called chassis skirts along the sides of the chassis—said skirts covering the tanks so that they can't be seen from the sides of the vehicles—can be noted there too. The chassis skirts are conducive to a reduced air resistance for the vehicle, while at the same time they give the vehicle a more integrated, design-friendly visual impression. An advantage as regards a circular tank is that it, owing to its round tank base form, has a minimal rest volume, i.e. the volume which never can be sucked up from the tank on account of the fuel suction tube of the tank of necessity being situated at a certain distance from the tank base.

An additional advantage as regards the circular tank is that it is mounted to the vehicle frame by means of two comparatively compact—and by that weight-saving—supporting brackets which also provide a satisfactory road clearance by means of being constructed as a vertical cradle having a partly circular contact surface for the tank. The supporting brackets are provided with attachments for straps, by means of which attachments the circular tank is forced into towards the cradles of the supporting brackets.

A disadvantage as regards the circular tank is that it has a tendency to rotate in its mounting during the vibrations and shakings of the driving and, as a result of this, to expose the fuel lines and the armatures to large strains. In fact, in many countries it is required that circular tanks also are provided with side-collision protections outside the tank, toward the vehicle sides, seeing that otherwise, it is feared, pedestrians or colliding smaller vehicles may end up under the chassis of the heavy vehicle in the event of a collision. However, no side-collision protections are required when rectangular tanks are used, which is due to the fact that their essentially plane sides against the vehicle sides themselves are considered to be adequate in this respect.

On the european market, the rectangular tank is instead the dominating tank type, which principally is due to the fact that it holds a comparatively larger fuel volume than the circular tank. Maximizing the fuel volume of the tank is also particularly important on, for example, the european market, where regulations prescribed by european law limits the maximum length allowed for the so-called vehicle equipage length, including the vehicle cabin and the load carrier part. Consequently, what is aimed for in Europe is the largest possible tank volume for the smallest possible vehicle length, which, thus, is the principal reason for the rectangular tank being demanded to such an extent. This circumstance is particularly noticeable as regards the decidedly most common heavy-goods vehicle, the semitrailer, which consists of a towcar and a separate load carrier part—i.e. the trailer. In the USA, however, the comparatively smaller fuel volume of the circular tank is not such a big problem, since the regulations prescribed by the US law only regulates the maximum length allowed for the actual load carrier part, wherein it is easy to instead make the tank that is situated on the towcar longer and thereby obtain the desired fuel volume. An additional advantage as regards the rectangular tank is that it, by means of its very rectangular form, does not present any tendencies to rotate in its mounting during driving, as is the case with the circular tank, which has been mentioned above.

However, one disadvantage as regards the rectangular tank is that it, due to its essentially plane tank base, has a comparatively large rest volume. Another disadvantage is that the tank is mounted to the vehicle frame by means of two L-shaped supporting brackets, which, on the one hand, are heavier than the corresponding partly circular supporting brackets for a circular tank and, on the other hand, result in an inferior road clearance and/or reduced fuel volume, which is due to the horizontal section of the L, which generally has a height of approximately 10 cm. Thus, the visual impression regarding the volume optimization of a rectangular tank as compared to a circular tank is somewhat illusory, which is due to the fact that a height that is equivalent to 10 cm is instead utilized for valuable fuel volume in the circular tank. Therefore, the actual difference in fuel volume between the two tank types is not as large as the eye might be lead to believe.

For the above-mentioned reasons, manufacturers of heavy-goods vehicles provide rectangular as well as circular tanks for their vehicles, all according to the demand. As has been mentioned above, the different tank types require completely different types of supporting brackets. In the end, simulateously providing both circular and rectangular tanks results in higher costs for the manufacturer as regards both construction and production, as compared to instead providing only one single tank type.

SUMMARY OF THE INVENTION

The object of the present invention is to provide a fuel tank for heavy vehicles, said fuel tank offering a combination of the most important advantages of a circular as well as a rectangular fuel tank. Thus, a fuel tank is provided which holds a comparatively large fuel volume, a small rest volume and a satisfactory road clearance, wherein the design of the fuel tank at the same time eliminates tendencies to rotations in the mounting and the need of additional side-collision protections along the sides of the tank.

Thus, the invention relates to a fuel tank for heavy vehicles, said fuel tank being adapted for mounting to a vehicle frame by means of at least one supporting bracket which discloses a partly circular contact surface against said fuel tank, wherein the tank comprises two end gable sections and an essentially cylindrical casing section which extends between said end gable sections. The fuel tank comprises a first section which is partly circular and faces towards the vehicle frame and is adapted for bearing against said partly circular contact surface on the supporting bracket, and a second section which is essentially rectangular and faces away from the vehicle frame.

Furthermore, the invention makes it possible to utilize supporting brackets of the same sort on all the vehicles, regardless of whether they are intended for markets on which either circular or rectangular tanks traditionally are demanded. Consequently, the constructional and the productional costs for the manufacturer can be substantially reduced.

Furthermore, the fuel tank according to the invention provides the same visual impression regarding the volume optimization as a rectangular tank, without the tank suffering from the drawbacks of the rectangular tank.

Other features and advantages of the invention will be apparent from the following description of a preferred embodiment and from the claims.

BRIEF DESCRIPTION OF THE DRAWING

The invention will be further described in the following with an embodiment and with reference to the annexed drawing, in which FIG. 1 shows a perspective view of a fuel tank according to the invention, said fuel tank being provided with supporting bracket and straps, FIG. 2 shows an end view of the fuel tank according to the invention, where the fuel tank is shown when mounted to a vehicle frame by means of supporting brackets and straps, and FIG. 3 shows a schematic, comparative profile view of the tank, where the differences in volume between a circular tank, a rectangular tank and a tank according to the invention is illustrated.

PREFERRED EMBODIMENT

In FIG. 1, the reference numeral 1 refers generally to a fuel tank according to the invention. The fuel tank 1 includes two end gable sections 5, 6 and an essentially cylindrical casing section 7 which extends between said end gable sections. A filling cover 10 and a tank armature 11, which is provided with, among other things, the fuel line (not shown) from the tank, are situated in a recess 12 on the upper side 13 of the tank 1. By means of the recess 12, the filling cover 10 and the tank armature 11 are situated so that they only marginally stick up above the upper side 13 of the tank and thereby are well protected from mechanical damages from, for example, a trailer chassis (not shown) which swings past just above said upper side.

As is clearly apparent from FIG. 1, the tank 1 is in a known manner intended to be mounted to a vehicle frame 2 by means of two supporting brackets 3, which are mounted on the vehicle frame by means of pin joints 17. Furthermore, the supporting brackets 3 are in a known manner provided with attachments for straps 15 which are provided with tightening devices 16, by means of which the tank 1 is forced into towards partly circular contact surfaces 4 on the supporting brackets. Conventionally, the tank 1 is made of steel panel, but it may also be made of other suitable materials, such as, for example, aluminium or plastics.

The tank 1 according to the invention is characterized in that its casing section 7 comprises a first section 8 which is partly circular 8 and faces towards the vehicle frame 2 and is adapted for bearing against said partly circular contact surface 4 on the supporting bracket 3, and a second section 9 which is essentially rectangular and faces away from the vehicle frame 2. For the sake of clarity, a dividing line 17 has been drawn in FIGS. 1 and 2 between the partly circular section and the rectangular section, which dividing line, however, can not be found on the actual tank. In this connection, the term partly circular section refers to a section of the tank which in profile—seen from the end gable sections 5, 6 of the tank—has the form of a circular sector, though not, however, a complete circle. In the preferred embodiment which is shown in the illustrations, this partly circular section (8) is semicircular. In this manner, a great advantage is accomplished in that the tank 1 can be mounted by means of supporting brackets of the well known type which for a long time has been utilized for mounting of circular fuel tanks.

Furthermore, by means of the particular design of the tank, a tank base—generally denoted by the reference numeral 18—is obtained which provides a rest volume which to a large extent is reduced as compared to a traditional rectangular tank, i.e. the volume which never can be sucked up from the tank on account of the fuel suction tube (not shown) of the tank 1 of necessity being situated at a certain distance from the tank base 18.

FIG. 2 also shows a so-called chassis skirt 19, which is situated close by the outside 24 of the tank 1. The chassis skirt 19 includes essentially vertical plastic panels 25 which extend along the vehicle sides and are supported by a frame work 20 which is mounted in the vehicle frame 2 by means of brackets (not shown). As is apparent from the drawing, the outside 24 of the tank 1, which includes one side of the above-mentioned rectangular section 9, is slightly curved outwards, i.e. in the direction away from the vehicle frame 2, in such a way that it projects into the frame work 20 in order to utilize an existing area 26 within the frame work 20 for fuel volume.

The tank 1 is prevented from rotating in its mounting during driving of the vehicle by means of the fact that the rectangular section 9 discloses sharp corners 27 in relation to the partly circular section 8, around which corners the straps 15 are forced to be bent and shaped into close contact by means of the tightening devices 16. As is apparent from FIG. 2, said corners 27 are situated in the lower edge and the upper edge, respectively, of the outside 24 of the tank 1. In this regard, the corners 27 disclose radiuses of curvature, denoted r i FIG. 2, which are at least 5 times smaller than the radius of curvature of the partly circular section 8, denoted R in the same drawing. Preferably, the radiuses of curvature, r, of the corners 27 are seven times smaller than the radius of curvature, R, of the partly circular section 8.

FIG. 3 shows schematically, in profile, the difference in fuel volume between the tank form according to the invention and the two known tank forms in directly comparable proportions and with the relative positions the fuel tanks would have had if they had been mounted in the same vehicle application. As before, the tank according to the invention is denoted by the reference numeral 1 and is shown with an unbroken line, whereas a circular tank 21 is shown with a broken line and a rectangular tank 22 is shown with a dotted line. As is apparent from the drawing, the base 23 of the rectangular tank is situated higher than the two other tank bases. The reason for this is, as has been mentioned before, that the L-shaped supporting bracket (not shown), which is required for the mounting of the rectangular tank 22, steals space in a downwards direction. Thus, in order to preserve a certain road clearance, some degree of fuel volume is lost when a rectangular tank 22 of the shown, traditional type is used. Furthermore, it is clearly apparent that the fuel tank 1 according to the invention has a larger fuel volume than the traditional tank. In comparison with the circular tank 21, the tank 1 according to the invention has 9% larger volume, and in comparison with the rectangular tank, the tank 1 according to the invention has 2% larger volume. The rectangular tank 22 has, however, a larger rest volume than the tank 1, and therefore the difference in usable fuel volume in reality is approximately 4–5%.

The invention is not limited to the embodiments which are described above and shown in the illustrations, but may be varied freely within the scope of the appended claims.

What is claimed is:

1. A fuel tank assembly for heavy vehicles, including a fuel tank being adapted for mounting to a vehicle frame by means of at least one supporting bracket which defines a partly circular contact surface against said fuel tank, wherein the tank comprises two end gable sections and an essentially cylindrical casing section which extends between said end gable sections, wherein the fuel tank comprises a first section which is partly circular and faces towards the vehicle frame and is adapted for bearing against said partly circular contact surface on the supporting bracket, and a second section which is essentially rectangular and faces away from the vehicle frame, and wherein said partly circular section of said tank is semicircular which cooperates with said partly circular section of said supporting bracket.

2. The fuel tank assembly according to claim 1, wherein said rectangular section defines an outside which is curved outwards in the direction away from said vehicle frame, by means of which said outside projects into a frame work which is situated close by said outside.

3. The fuel tank assembly according to claim 2, wherein said frame work supports a chassis skirt.

4. The fuel tank assembly according to claim 1, wherein the rectangular section defines sharp corners with respect to the partly circular section, said sharp corners being intended to be shaped into close contact against at least one strap which in a known manner is mounted in the supporting bracket for attachment of the fuel tank.

5. The fuel tank assembly according to claim 4, wherein said corners define radiuses of curvature (r) which are at least five times smaller than the radius of curvature (R) of the partly circular section.

6. The fuel tank assembly according to claim 4, wherein said corners define radiuses of curvature (r) which are seven times smaller than the radius of curvature (R) of the partly circular section.

* * * * *